3,417,158
METHOD OF INHIBITING AUTOOXIDIZABLE
AROMATIC COMPOUNDS
Milton G. Forry, Jr., and Robert J. Agnew, Fishkill, and
Kenneth L. Dille, Wappingers Falls, N.Y., assignors to
Texaco Inc., New York, N.Y., a corporation of
Delaware
No Drawing. Filed Sept. 9, 1965, Ser. No. 486,190
7 Claims. (Cl. 260—674)

ABSTRACT OF THE DISCLOSURE

Degradation of an autooxidizable aromatic hydrocarbon, particularly isopropylbenzenes, such as cumene, is inhibited by storing the hydrocarbon in contact with an acidic heterogenous catalyst. Such catalyst, as a sulfonic acid cation exchange resin or silica gel will, when contacted with cumene, cause the splitting of oxidation products such as cumene hydroperoxide to produce phenol which in turn inhibits further degradation of cumene.

This invention relates to a method of inhibiting the autooxidation of commercial high purity cumene and related aromatic compounds. In particular, this invention relates to the use of an acidic heterogeneous catalyst to substantially prevent the formation of undesirable degradation products in cumene and related aromatic compounds during prolonged storage in vented tankage.

It is an object of this invention to provide a method for preventing the oxidation of oxidizable aromatic compounds.

Another object of this invention is to provide a method for preventing the autooxidation of cumene to cumene hydroperoxide.

Another object is to provide a method of maintaining cumene in storage in a sufficiently high degree of purity to obviate a feed preparation step in the cumene hydroperoxide process for producing phenol and acetone.

A further object is to prevent the formation of degradation products in cumene and related aromatic compounds.

Still another object is to maintain cumene and related oxidizable aromatic compounds in a high degree of purity for prolonged periods in outdoor vented storage tanks.

We have found that these and other objects of this invention are accomplished by contacting the stored aromatic compound with an acidic heterogenous catalyst. We found that such a catalyst will with cumene, for example, preferentially cause the cumene oxidation product to split forming phenol which in turn prevents further oxidation of the cumene. We have further found that the acidic heterogenous catalysts useful in our invention will inhibit the autooxidation of aromatic compounds represented by the formula:

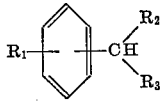

where $R_1$ is hydrogen, a straight chain $C_1$ to $C_3$ alkyl group or

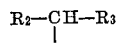

and where $R_2$ and $R_3$ are straight chain $C_1$ to $C_3$ alkyl groups. The most common aromatic compound which is inhibited by our process and the one with which it is especially useful is cumene. Other aromatic compounds with which our process finds particular use include diisopropylbenzene, cymene and ethylisopropylbenzene.

When exposed to the atmosphere, hydrocarbons often deteriorate through an oxidation process. This process, called autooxidation, is a free radical reaction to which hydrocarbons having a tertiary hydrogen are particularly susceptible. The compounds with which our invention are useful and which, as described above, are represented by the formula,

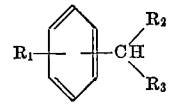

are especially subject to air oxidation since they contain at least one hydrogen atom that is not only tertiary but which is further activated by the unsaturated benzene ring.

This autooxidation may be initiated thermally or by such catalysts as peroxides or azo compounds. Once underway, the reaction is autocatalytic since the oxidation product, a hydroperoxide, is itself a free radical initiator. One chain mechanism suggested for the autooxidation of cumene is:

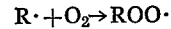
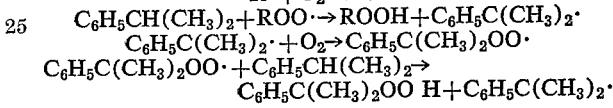

Initiator→R·
R·+O$_2$→ROO·
C$_6$H$_5$CH(CH$_3$)$_2$+ROO·→ROOH+C$_6$H$_5$C(CH$_3$)$_2$·
C$_6$H$_5$C(CH$_3$)$_2$·+O$_2$→C$_6$H$_5$C(CH$_3$)$_2$OO·
C$_6$H$_5$C(CH$_3$)$_2$OO·+C$_6$H$_5$CH(CH$_3$)$_2$→
C$_6$H$_5$C(CH$_3$)$_2$OO H+C$_6$H$_5$C(CH$_3$)$_2$·

Free radical intermediates are found not only in air oxidation of hydrocarbons but in certain types of polymerization, as for example, vinyl polymerization. It is known that both these reactions are chain reactions which may be accelerated by initiators or inhibited by free radical scavengers. Quinones and nitro compounds are well known inhibitors which will terminate or reduce the rate of a vinyl polymerization by adding radicals which in turn form new radicals which are not sufficiently reactive to propagate the polymerization reaction. However, when these particular materials are added to a hydrocarbon having a tertiary hydrogen atom, they have no effect at all in inhibiting air oxidation. Amines and phenols, on the other hand, are well known as effective anti-oxidants. The character of the respective inhibition reactions has been suggested as explaining the specificity of these materials—quinones and nitro compounds are thought to destroy hydrocarbyl radicals in the polymerization, while the phenols and amines react with the peroxy radicals (ROO·), to terminate or reduce the rate of air oxidation.

Our invention is described herein in detail with reference to inhibiting the autooxidation of cumene. This was done for purposes of illustration and to simplify the description. By this illustrative use of cumene, we do not intend to limit the application of our invention to this particular aromatic compound. As discussed at length above, our process will inhibit the oxidation of a class of compounds represented by the generic formula illustrated above and which are susceptible to the formation of hydroperoxide through air oxidation reaction.

It is known also that although phenols and amines are anti-oxidants and will inhibit the degradation of cumene and substituted cumenes, phenol is not only superior to these other well known anti-oxidants such as, 2,6-ditertiarybutyl-4-methylphenol, but is actually the preferred anti-oxidant where cumene will subsequently serve as a feed stock in the hydroperoxide cleavage process for producing acetone and phenol. Although other anti-oxidants are able to adequately and satisfactorily prevent the oxidation of cumene, they often must be removed before the cumene may serve as a feed supply for the phenol production process.

Cumene (isopropylbenzene),

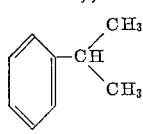

was produced in large quantities during World War II for use as a blending agent for 100 octane gasoline. More recently, it has become an important intermediate in the production of phenol. Cumene may be produced by the alkylation of benzene with propylene, phosphoric acid-kieselguhr or $AlCl_3$ serving as a catalyst. Alternately, benzene may be alkylated with n-propyl bromide, isopropyl bromide or mixtures thereof with $AlCl_3$ as the catalyst to produce cumene.

Cumene hydroperoxide,

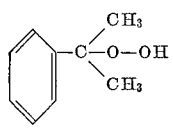

the principal product formed by the oxidation of cumene, will, as discussed above, initiate further oxidation of cumene. In addition, this compound is relatively unstable, decomposing to form α-methylstyrene, acetophenone, α,α-dimethylphenyl carbinol, phenol and other decomposition products under uncontrolled conditions.

To produce phenol and acetone, cumene feed is oxidized under controlled conditions to form cumene hydroperoxide with a trace of sodium hydroxide added to the cumene prior to air blowing to prevent decomposition of the sensitive hydroperoxide. Cleavage of the cumene hydroperoxide is then accomplished under acid catalysts to form phenol and acetone. U.S. 3,037,052 discloses such a process employing a cation exchange resin as a catalyst. The cumene feed to the oxidation step must be of extremely high purity as small quantities of such materials as phenol, α-methylstyrene and acetophenone are known to interfere with the formation of cumene hydroperoxide. The presence of these materials in more than trace amounts necessitates a somewhat involved process of purification of the cumene.

When produced by the alkylation of benzene, cumene may be recovered with a purity exceeding 99% which makes this aromatic hydrocarbon an ideal feed stock for the cumene hydroperoxide cleavage process. However, if cumene is stored for prolonged periods in vented tankage, the autooxidation reaction with air will form cumene hydroperoxide and its subsequent degradation products thereby rendering the cumene unsatisfactory as a feed stock for the hydroperoxide cleavage process unless a feed stock purification step is utilized. Cumene stored for two or three weeks in outdoor vented tankage frequently is below feed stock purity requirements because of oxidation degradation products.

It is known that cumene having a maximum Acid Wash Color (AWC) of two or less may be employed satisfactorily as a feed stock for the production of phenol and acetone by the cumene hydroperoxide process. The use of our invention maintains the cumene in "on specification" conditions for extended periods of time as explained below and therefore finds particular use when storing cumene feed stock for the phenol and acetone production process. The Acid Wash Color test (ASTM D848-62) is an extremely sensitive test intended to indicate the content of undesirable unsaturated hydrocarbons in aromatic solvents. The test is performed by shaking the aromatic hydrocarbon with sulfuric acid under specified conditions. The color of the sulfuric acid layer is compared with a set of color solution standards and is reported as the number of the nearest matching standard together with a plus or minus sign if the sample is darker or lighter, respectively, than the standard. The color scale ranges from 0 (water white) to 14 (concentrated $K_2Cr_2O_7$ solution). A maximum AWC of 2 (light amber) must be maintained during storage of cumene which is to serve as feed for the production of phenol and acetone. This empirical test sets no exact limitation on the allowable percentages of unsaturated hydrocarbons and little is known concerning the components which are particularly unsatisfactory with respect to Acid Wash Color.

In order to evaluate the effectiveness of the inhibition, a test may be employed to measure the concentration of hydroperoxide in cumene. In this test, the hydroperoxide concentration is measured as the milliequivalents of active oxygen per liter of solution and is reported in parts per million. The test is conducted by extracting and reducing the aromatic hydroperoxide with a solution of sodium arsenite which is subsequently refluxed and titrated with iodine to a starch end-point. This technique is extremely sensitive for determining low concentrations of hydroperoxide.

As discussed above, it is known that acidic catalysts will promote the splitting of cumene hydroperoxide to form phenol and acetone. We have found that certain acidic heterogeneous catalysts are sufficiently active at atmospheric temperature to initiate this reaction. We also found that these catalysts will cause this reaction to occur even when the hydroperoxide is present in cumene in only trace amounts. We have further discovered that as cumene oxidizes to form cumene hydroperoxide, these catalysts promote the formation of phenol which in turn prevents further oxidation of the cumene.

Our process for increasing the storage stability of cumene is self-sustaining. As cumene oxidizes to cumene hydroperoxide, the catalyst causes the hydroperoxide to split, forming phenol which inhibits subsequent oxidation of the cumene by destroying free radical intermediates. As the phenol is used up, further cumene oxidation forms more hydroperoxide which the catalyst splits to produce phenol thereby inhibiting the cumene and completing the cycle. The particular advantage of our process is that in addition to being self-sustaining, it is self-regulating so that the concentration of hydroperoxide is not present in sufficient concentration to catalyze the oxidation of the aromatic compound and the phenolic inhibitor is never present in more than trace amounts but in a sufficient concentration nevertheless to inhibit the aromatic compound. Our invention maintains cumene in a substantially pure condition while destroying any oxidation-catalyzing hydroperoxides as they form and producing a phenol inhibitor as it is needed.

Any acidic heterogeneous catalyst well known in the art can be utilized in our invention. For example, such catalysts as alumina, silica gel, bauxite, acidic ion exchange resins, acidic molecular sieves and acidic solid industrial catalysts may be used. We have found that silica gel and acidic cation exchange resins, for example, a sulfonic acid cation exchange resin having a macroreticular structure sold under the trade name "Amberlyst 15" by Rohm & Haas, are particularly useful.

The solid catalyst may be contacted with the cumene during its storage in outdoor vented tankage by any of several methods. The particular technique depends on the initial purity of the cumene, the Acid Wash Color to be maintained, the type and cost of the catalyst employed, and the type, size and construction of the storage tanks. Thus, the catalyst may be contacted with the cumene by a static process with the catalyst covering the bottom of the storage tank or, preferably, contained in a perforated basket or chamber suspended in the cumene or maintained in a fixed bed below the surface of the stored cumene. A dynamic method was found to be particularly efficient. By drawing a quantity of cumene from the storage tank and pumping it through a bed of catalyst and back to the tank, a small quantity of catalyst can treat a large volume of cumene, inhibiting it from autooxidation. The circulation of cumene through the bed may be continuous or periodic depending on the condition of the hydrocarbon or the purity level to be maintained.

We found that, when employing a sulfonic acid type cation exchange resin in a dynamic version of our invention, as little as 0.25 lb. of the catalyst for each 1000 gallons of cumene would maintain the cumene at an Acid Wash Color of less than 2 for periods exceeding several months where the average cumene turnover rate was approximately once every sixteen hours.

Appropriate amounts of the various useful catalysts for the static and dynamic methods described and other well known contacting methods may be readily determined by one skilled in the art. Other operating variables such as flow rates, etc., which are dependent on the particular catalyst employed, may also be easily determined by the skilled artisan.

The cleavage of cumene hydroperoxide in the presence of an acidic catalyst is well known but some of the heterogeneous materials which will catalyze the reaction will do so only under certain conditions, such as, a water-free catalyst or an elevated operating temperature. We found that when such catalysts are used in our invention, where the cleavage of cumene hydroperoxide need only produce sufficient phenol to maintain the Acid Wash Color of cumene below 2, such special conditions or precautions need not be observed. Thus, atmospheric or room temperature is adeqaute to initiate the reaction and dehydration of the catalyst before use is not necessary.

In addition to maintaining cumene at specification purity, the process of our invention may also be employed to bring off-test cumene back to acceptable purity levels. For example, cumene having an Acid Wash Color of 14+ may be slowly contacted with a bed of heterogeneous acidic catalyst to produce a product having an AWC below 2. We found that at a space velocity [V(cumene)/V(catalyst)-hr.] of 18, silica gel could restore grossly off-test cumene to a specification product. A sulfonic acid cation exchange resin was only partially successful under the same conditions.

As pointed out previously, our process is not restricted to increasing the storage stability of cumene. Other aromatic solvents susceptible to air oxidation and degradation through hydroperoxide formation will in the presence of an acid catalyst split to phenol or a phenol derivative. To various degrees, the phenols produced will inhibit the subsequent oxidation of these aromatics. Our process may be employed to maintain the purity of such other compounds as diisopropylbenzene, cymene, ethylisopropylbenzene, 2-phenylalkanes, 3-phenylalkanes and the like. Stated in more general terms, our invention is useful for inhibiting the oxidation of compounds having the formula:

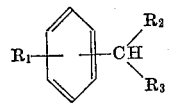

where $R_1$ is selected from the group consisting of hydrogen, straight chain $C_1$ to $C_3$ alkyl and

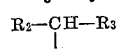

and where $R_2$ and $R_3$ are straight chain $C_1$ to $C_3$ alkyls.

The following examples will further illustrate this invention.

EXAMPLE I

This demonstrates that an acidic heterogeneous catalyst will split cumene hydroperoxide to form phenol.

5 grams of a sulfonic acid cation exchange resin were placed in each of two beakers. 150 grams of commercial grade cumene were poured into each beaker. 0.243 gram of cumene hydroperoxide were added to the first beaker, 0.024 gram to the second. The first beaker was heated to 100° C. and the contents stirred for one hour. The second beaker was stirred for one hour at room temperature.

150 grams of production grade cumene to which 0.024 gram of cumene hydroperoxide had been added where slowly passed at room temperature through a column containing 10 grams of the sulfonic acid cation exchange resin.

Samples of cumene were taken prior to and after contacting with the resin in each case. The results are shown below:

TABLE I

| | Stir with resin at 100° C. | | Stir with resin at 27° C. | | Resin column | |
|---|---|---|---|---|---|---|
| | Before | After | Before | After | Before | After |
| CHP,[1] p.p.m. | 1,700 | 79 | 364 | 249 | 298 | 116 |
| Phenol, p.p.m. | | 610 | 1 | 45 | 0 | 23 |

[1] Cumene hydroperoxide.

The decrease in CHP content and increase in phenol content indicate that CHP was converted to phenol.

EXAMPLE II

This shows the ability of a acidic catalyst to maintain the purity of cumene during prolonged storage periods in tanks vented to the atmosphere.

Four five-gallon hot rolled steel test drums each having a vented top were placed in a water bath maintained at 110° F. Five gallons of high purity commercial grade cumene were added to each drum. Drum A served as the control. 0.1 gram of sulfonic acid cation exchange resin were placed in a wire gauze basket and suspended in the cumene in drum B. The contents of drum C were circulated at 19 ml./min. through a column containing 0.5 gram of the acidic resin. The cumene in drum D was also circulated in a similar fashion through 1.0 gram of resin. The results in Table II show the effectiveness of the various methods in increasing the storage life of cumene.

TABLE II

| Weeks | Drum A | | Drum B | | Drum C | | | Drum D | | |
|---|---|---|---|---|---|---|---|---|---|---|
| | AWC | CHP, p.p.m. | AWC | CHP, p.p.m. | AWC | CHP, p.p.m. | Phenol, p.p.m. | AWC | CHP, p.p.m. | Phenol, p.p.m. |
| 0 | 1− | 123 | 1− | | 1− | | 1 | 1− | | 1 |
| 1 | 1 | 1,700 | 1− | | 1− | | | 1− | | |
| 2 | 8+ | 9,500 | 1− | 13 | 1− | | | 1− | | |
| 3 | 10+ | | 2 | 26 | 1− | 0 | 10 | 1− | 0 | 1 |
| 4 | 14+ | 10,980 | 4− | 0 | 1− | 83 | | 1− | 125 | |
| 6 | | | 7+ | 83 | 1− | 84 | | 1− | 41 | |
| 8 | | | | | 1− | 720 | 10 | 1− | 800 | 2 |
| 10 | | | | | 1+ | 0 | 17 | 1 | 26 | 0 |
| 12 | | | | | 2 | | | | | |

This demonstrates that an acidic heterogeneous catalyst will significantly increase the storage life of cumene. Doubling the amount of resin through which the cumene was circulated did not extend the storage time significantly.

Since this testing method is an accelerated test with the cumene maintained at an elevated temperature, the permissive storage times under atmospheric conditions would be substantially longer than these tests demonstrate.

EXAMPLE III

This demonstrates the ability of heterogeneous acidic catalysts to restore off-test-cumene.

Grossly off-test cumene having an AWC of 14+ was passed through a bed containing 10 ml. of silica gel at a rate of 3 ml./min. The effluent from the bed was collected in four successive 25 ml. portions. In a similar manner, the off-test cumene was passed through four other columns containing sulfonic acid cation exchange resin, bauxite, 13X molecular sieves and polyphosphoric acid in kieselguhr, respectively. The Acid Wash Color of the cumene effluent is presented below.

| Bed material | AWC of successive samples | | | |
|---|---|---|---|---|
| | #1 | #2 | #3 | #4 |
| Silica gel | 1− | 2− | 3+ | 5 |
| Sulfonic acid cation exchange resin | 4 | 5 | 5 | 5 |
| Bauxite | 5 | 10 | 14+ | 14+ |
| 13X molecular sieve | 7 | 8 | 9 | 8 |
| Polyphosphoric acid on kieselguhr | 6 | 6 | 6 | 6 |

Using this method, silica gel and the cation exchange resin were the most effective materials although only silica gel was capable of reducing the AWC below the maximum specification standard of 2.

Obviously, many modifications and variations of the invention, as hereinbefore set forth, may be made without departing from the spirit and scope thereof and only such limitations should be imposed as are indicated in the appended claims.

We claim:
1. A method of inhibiting the autooxidation of an aromatic compound which comprises contacting an autooxidizable aromatic compound containin trace amounts of its corresponding hydroperoxide under ambient temperature conditions with a hetrogeneous acidic catalyst selected from the group consisting of silica gel, acidic cation exchange resin, buaxite and acidic molecular sieves, said aromatic compound having the formula:

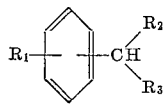

where $R_1$ is selected from the group consisting of hydrogen, straight chain $C_1$ to $C_3$ alkyl and

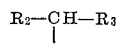

and $R_2$ and $R_3$ are straight chain $C_1$ to $C_3$ alkyls and where said catalyst is present in sufficient quantity to maintain the Acid Wash Color of said compound below a maximum of 2.

2. A method according to claim 1 wherein the acidic heterogeneous catalyst is a sulfonic acid type cation exchange resin.

3. A method according to claim 1 wherein $R_1$ is hydrogen and $R_2$ and $R_3$ are methyl.

4. A method according to claim 3 wherein the contacting comprises continuously circulating the aromatic compound through a bed of the catalyst at least once a day.

5. A method according to claim 4 wherein the catalyst is a sulfonic acid type cation exchange resin and the ratio of said catalyst to said aromatic compound is between 0.2 and 0.5 lb./1000 gallons.

6. A method according to claim 3 wherein the acidic heterogeneous catalyst is silica gel.

7. A method according to claim 3 wherein the acidic heterogeneous catalyst is a sulfonic acid type cation exchange resin.

References Cited

UNITED STATES PATENTS

| | | | |
|---|---|---|---|
| 2,629,744 | 2/1953 | Joris | 260—610 |
| 2,906,789 | 9/1959 | McNaughtan | 260—674 |
| 3,037,052 | 5/1962 | Bortnick | 260—671 |

DELBERT E. GANTZ, *Primary Examiner.*

C. E. SPRESSER, Jr., *Assistant Examiner.*

U.S. Cl. X.R.

260—610, 666.5